United States Patent
Selvatici

[19]

[11] Patent Number: 5,810,092
[45] Date of Patent: Sep. 22, 1998

[54] IMPLEMENT FOR IMPROVING THE HYGROSCOPIC PROPERTIES OF SOIL

[76] Inventor: Franco Selvatici, Via Laura Rodriguez, 4, 40068 San Lazzaro di Savena (Bologna), Italy

[21] Appl. No.: 803,226

[22] Filed: Feb. 20, 1997

[30] Foreign Application Priority Data

Feb. 22, 1996 [IT] Italy ................................ BO96A0079

[51] Int. Cl.⁶ .................................................. A01B 33/00
[52] U.S. Cl. ................... 172/94; 172/92; 172/21; 172/417; 172/484; 172/497; 74/89.15; 74/105
[58] Field of Search ..................... 172/92, 19, 21, 172/22, 739, 740, 307, 417, 484, 497, 624.5, 94, 25; 111/200; 74/526, 89.15, 105; 414/917

[56] References Cited

U.S. PATENT DOCUMENTS

| | | | |
|---|---|---|---|
| 3,263,515 | 8/1966 | Adamski | 74/105 |
| 4,178,005 | 12/1979 | Kent, Jr. | 172/417 X |
| 4,422,510 | 12/1983 | De Ridder | 172/21 |
| 4,614,239 | 9/1986 | Minagawa et al. | 172/21 |
| 4,616,714 | 10/1986 | Lister | 172/21 |
| 4,750,565 | 6/1988 | Hansen et al. | 172/22 |
| 4,846,084 | 7/1989 | Sigle | 172/624.5 X |
| 5,029,652 | 7/1991 | Whitfield | 172/21 |
| 5,207,278 | 5/1993 | Hatlen | 172/21 X |
| 5,245,771 | 9/1993 | Walsh | 172/484 X |
| 5,570,746 | 11/1996 | Jones et al. | 172/22 |
| 5,641,025 | 6/1997 | Kawaguchi | 172/21 |

FOREIGN PATENT DOCUMENTS

| | | |
|---|---|---|
| 037595 | 10/1981 | European Pat. Off. . |
| 2568905 | 8/1984 | France . |
| 2625405 | 12/1987 | France . |
| 87 02 803 | 2/1987 | Germany . |
| 43 33 310 | 9/1993 | Germany . |
| 2156642 | 10/1985 | United Kingdom .......... 172/21 |
| WO89/12381 | 12/1989 | WIPO . |
| WO91/07076 | 5/1991 | WIPO . |

*Primary Examiner*—Terry Lee Melius
*Assistant Examiner*—Victor Batson
*Attorney, Agent, or Firm*—Fay, Sharpe, Beall, Fagan, Minnich & McKee

[57] ABSTRACT

The invention relates to an implement for treating soil and, in particular, to an implement used to improve the hygroscopic properties of the soil by making holes in it using one or more tools mounted on an irregular, variable, quadrilateral jointed structure pivoted to a frame and actuated by a linkage system which can modify its configuration in such a way as to drive the tool into the soil and then angle it gradually so as to widen the bottom of the hole.

3 Claims, 3 Drawing Sheets

IMPLEMENT FOR IMPROVING THE HYGROSCOPIC PROPERTIES OF SOIL

BACKGROUND OF THE INVENTION

The present invention relates to an implement for treating soil and, in particular, to an implement used for improving the hygroscopic properties of the soil by making holes in it to retain irrigation or rain water.

Grounds covered by lawn or turf, especially those forming part of parks or sports facilities such as, for example, golf courses, football fields or racecourses, require special care and attention to ensure the correct distribution of the grass cover and the regular compactness of the ground.

In other words, the ground surface must be uniformly covered by turf and compact enough to allow good drainage, while at the same time reacting correctly to treading.

Therefore, besides attending to the cultivation of the actual turfgrass, it is necessary to treat the soil for two purposes because it must be sufficiently loosened up to allow efficient drainage but, at the same time, it must have a plain, regular surface and must remain compact enough to be easily walked over or allow sport to be played on it.

The treatment of the soil can be carried out using appropriate implements or machines which make holes in the soil and work it in order to confer the properties described above.

These implements may be self-propelled or linked to the power take-off of a tractor and are equipped with means for making holes consisting of a plurality of pointed tools which make holes as described below.

The holes are made in an uninterrupted succession of steps: first of all, a pointed tool is driven into the ground in a substantially vertical direction; next, the tool is angled in such a way as to widen the bottom of the vertical hole; the tool is then pulled out of the soil in a substantially vertical direction, similar to the one in which it was inserted.

These steps produce a hole that is shaped substantially like a cone portion or truncated cone, wide at the bottom and tapering up to a narrower opening at the top so that the surface of the turf remains as undisturbed as possible.

The angling operation which gives the hole its tapered shape also partially breaks up the soil, that is to say, it makes it slightly less compact in order to improve drainage but without making it so loose as to make the turf difficult to walk or play on.

The movements of the pointed tools according to the steps described above are achieved by different means in the machines currently used for this purpose.

In some machines, the pointed tools are appropriately connected to a drive shaft through a crank mechanism which converts the rotational movement of the shaft into the continuous sequence of movements which the tool must make, namely, vertical lowering, angling to widen the hole and vertical extraction. The operation of these machines is achieved entirely by the mechanical structure of the crank mechanisms connecting the drive shaft to the tools.

In other machines, tool drive is achieved by combining strictly mechanical action of the kind described above with the contribution provided by the interaction of the tool with the soil as the machine travels over the ground concerned, also with the aid of the reaction of springs mounted in such a way as to act in a direction opposite that in which the machine is travelling.

SUMMARY OF THE INVENTION

The present invention envisages a mechanical tool drive using, for each pointed tool or group of pointed tools, a quadrilateral, jointed structure actuated by a drive shaft. The quadrilateral jointed structure consists of at least three rigid rods pivoted to each other and of which two are also pivoted at one end to a supporting frame. Depending on the drive transmitted by the shaft through a linkage system, the said pivoted rods, whose ratio to the frame is variable so as to form an irregular, variable quadrilateral, cyclically assume different configurations, making it possible to accordingly vary the angle of the tool mounted by the structure as it penetrates the soil.

Thanks to the irregular, variable quadrilateral structure, it is possible to change the dimensional ratios between the rods so as to correspondingly change the configurations assumed by the articulated structure and, depending on these configurations, gradually vary the angle of the tool when it is driven into the ground.

BRIEF DESCRIPTION OF THE DRAWINGS

The technical characteristics of the invention according to the abovementioned aims are described in the claims below and its advantages are apparent from the detailed description which follows, with reference to the accompanying drawings which illustrate a preferred embodiment of the invention and in which:

DESCRIPTION OF THE PREFERRED EMBODIMENTS

Figure 1:
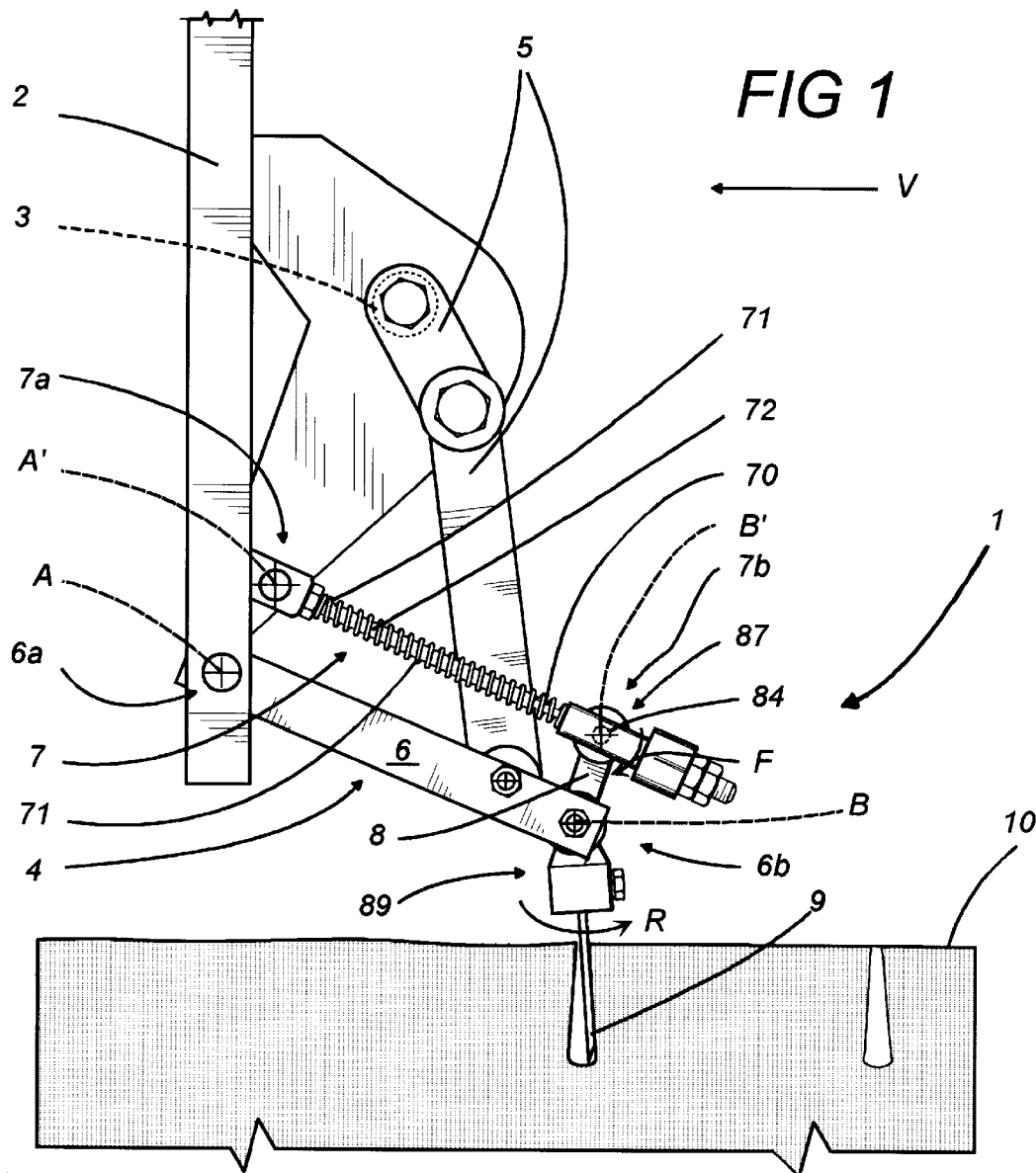
FIG. 1 is schematic side view of an embodiment of the implement disclosed by the present invention.

With reference to the drawings listed above, which show one of the possible embodiments of the invention, an implement 1 is of the type that can be mounted on a tractor (not illustrated).

The implement 1 can be connected to a tractor at the so-called three-point linkage using a mounting assembly (also not illustrated) envisaged on a supporting frame 2 of the implement 1.

As stated above, the operation of the implement envisages a succession of steps that may be summarized as follows: inserting (or driving) a tool into the soil in a substantially vertical direction, gradually angling the tool so as to make a hole that is wider at the bottom end and finally pulling the tool out of the soil.

To carry out this succession of steps, the implement comprises an irregular, jointed quadrilateral structure 4 mounting at least one tool 9.

The jointed quadrilateral structure consists of three rigid rods 6, 7 and 8.

The first rod 6, placed at the bottom in the examples illustrated in the drawings, is pivoted at one end 6a to the supporting frame 2 and at the other end 6b to the third rod 8, respectively about the pivot axes labelled A and B in the drawings.

The second rod 7, placed at the top in the examples illustrated in the drawings, is pivoted at one end 7a to the supporting frame 2 and at the other end 7b to the third rod 8, respectively about the pivot axes labelled A' and B' in the drawings.

The third rod 8 is equipped with means 89 for fixing it to a pointed tool 9.

There is also a drive shaft 3, that can be linked to drive means (for example to the power take-off of a tractor). The shaft 3 is connected to the quadrilateral structure 4 through a crank mechanism 5 designed to cyclically convert the rotational motion into corresponding positions of the jointed quadrilateral structure 4.

Figure 3:
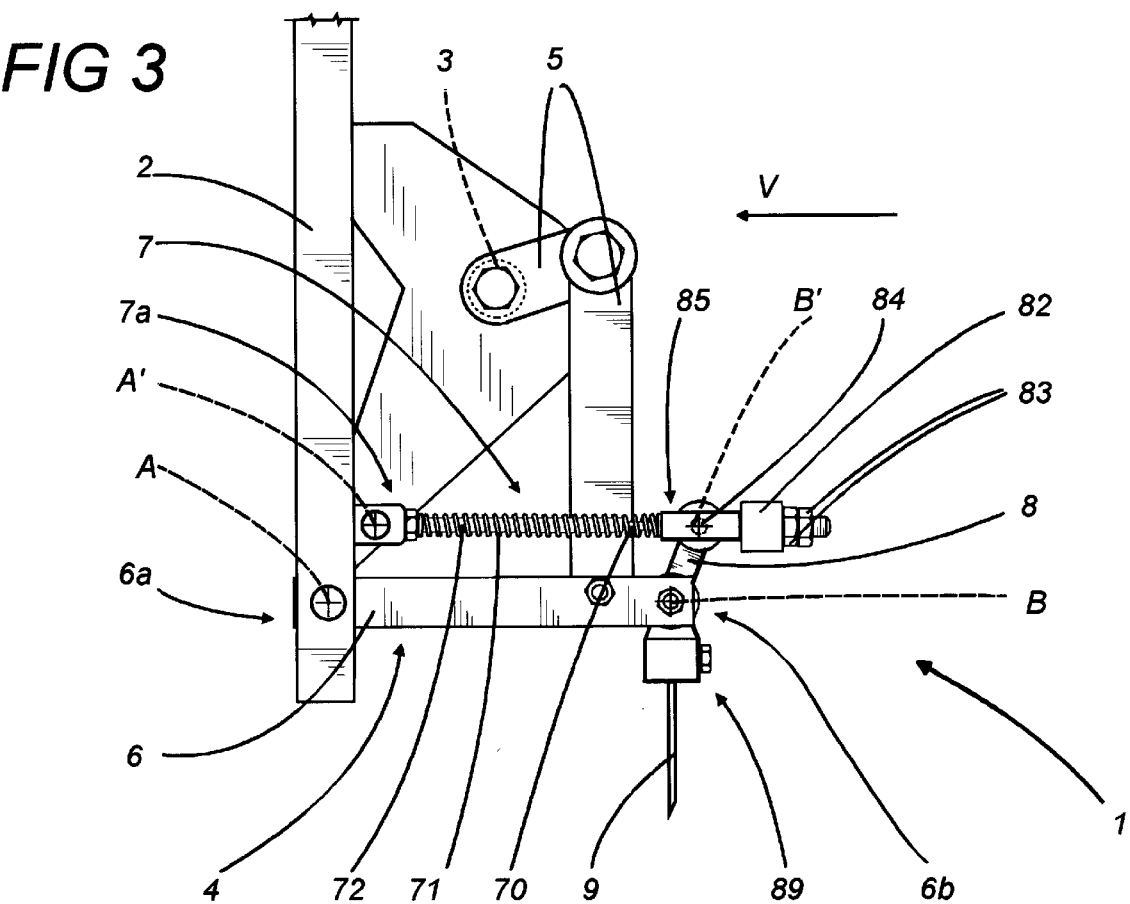

In this way, according to the positions assumed by the jointed quadrilateral structure 4, the mounted tool 9 can be moved gradually from a first configuration in which it is substantially vertical, as shown in FIG. 3, to a second configuration (illustrated in FIG. 1), after being driven into the soil 10, in which it is angled in such a way as to widen the bottom ends of the holes made.

In other words, the tool is driven into the soil in a substantially vertical direction and gradually angled in the direction labelled R in the drawing and following the relative rotation about pivot axis B' (illustrated as F in FIG. 1) of the third rod 8 about the pivot point so as to make the widened holes mentioned above.

The section 87 of the third rod 8 which is pivoted to the second rod 7, is connected to pivoting means comprised of pivot 84 and sleeve 85 that can be stably attached to the second rod 7 at different positions along the second rod itself. In this way, according to the novel concept disclosed by the present invention, it is possible to move the point where the rod 7 is pivoted so as to change the dimensional ratios of the rods 6 and 7 pivoted to the frame thus causing the movements of the structure to follow different paths. As a result of this, the tool 9 can be positioned at different angles.

Figure 5:
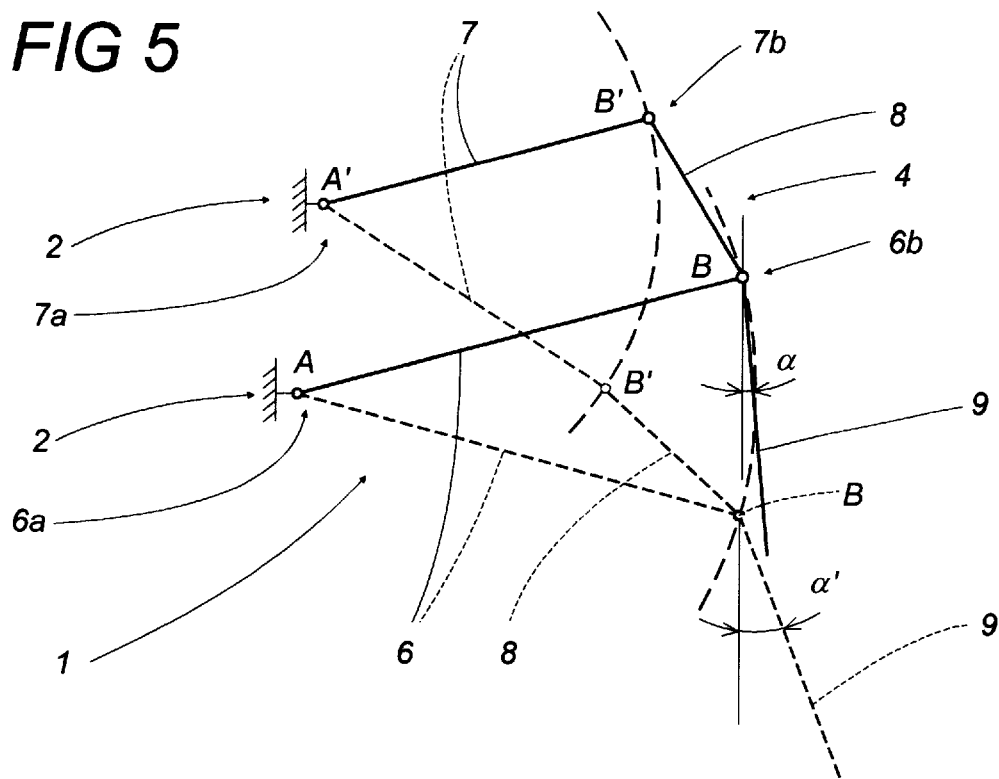
FIG. 5 schematically illustrates examples of configurations that can be assumed by the irregular, variable quadrilateral structure according to the present invention.
Figure 5:
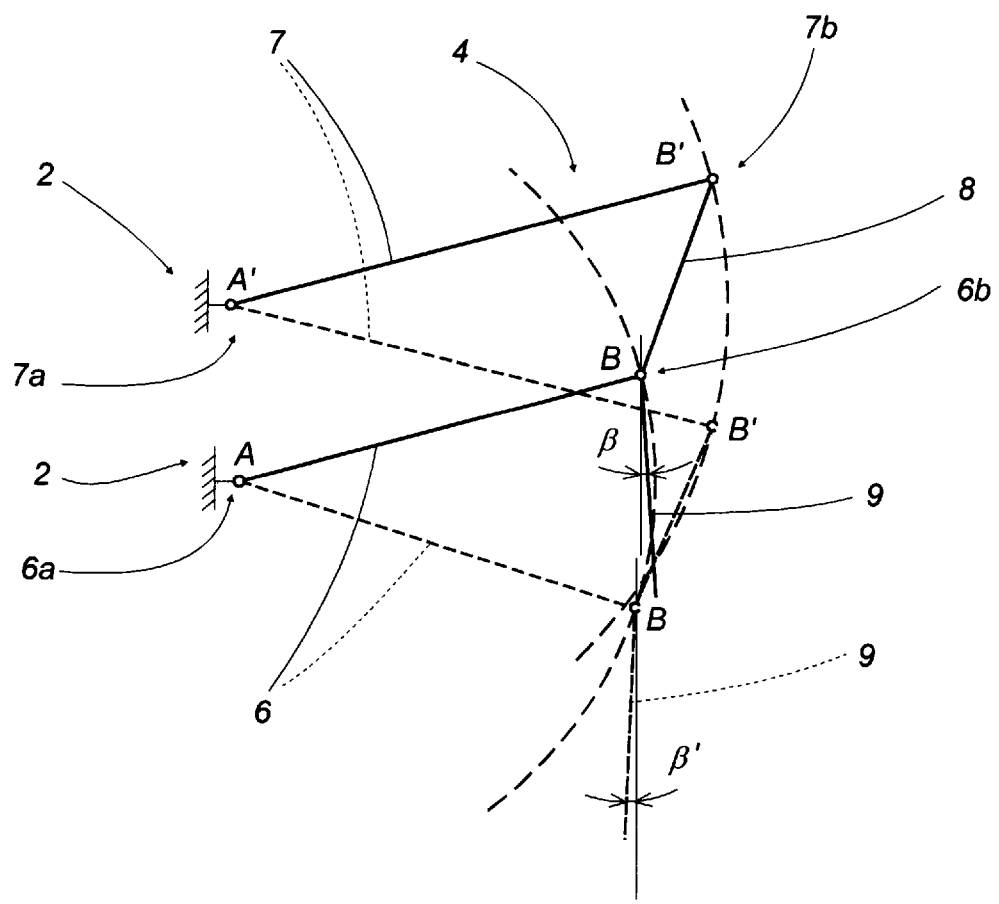

This feature is illustrated more clearly in the diagram in FIG. 5, which shows two example configurations, one where the first rod 6 is longer than the second rod 7 and the other where it is shorter.

The first example, where the first rod 6 is longer than the second rod 7, is the one at the top. This example shows that a first angle $\alpha$ made by the tool 9 with the vertical when the articulated structure 4 is raised from the ground is widened to become $\alpha'$ when the structure is lowered and the tool driven into the ground. By changing the ratio between the lengths of the two rods 6 and 7, it is possible to modify the quantity by which the angle increases when the tool is driven into the ground. In the second example, illustrated at the bottom of FIG. 5, the angle $\beta$ becomes $\beta'$ when the tool 9 is driven into the soil 10.

Thanks to the possibility of modifying the irregular quadrilateral structure in this way, it is possible to make the bottom ends of the holes wider or narrower according to the type of soil to be treated and the desired effects on drainage and compactness.

The possibility of changing the dimensioning ratios of the jointed structure also means that the implement can be adjusted to suit the type of machine drive, the hardness of the soil, the type of vegetation covering the soil, and so on.

In relation to the direction of travel V of the implement 1, the pivot points A and A' between the jointed structure 4 and the frame 2 are placed at the front of the rest of the structure. With this reference, the second rod 7 consists of a stem 70 with a spring 71 fitted round it from the front and a sleeve 85 from the back. The sleeve 85 mounts means for pivoting the second rod 7 to the third rod 8. In practice, the sleeve envisages a pin 84 defining the pivot point B' between the second rod 7 and the third rod 8.

At the other end 7*b* of the second rod 7 there are reversible means 83 for locking the movement of the sleeve 85.

These reversible locking means 83 may consist of a nut and lock nut screwed on the threaded end 7*b*.

Figure 4:
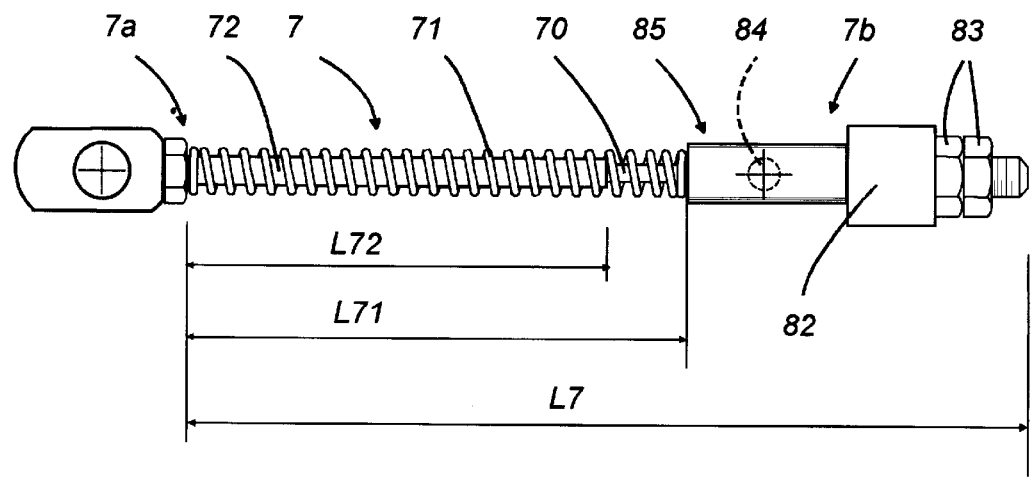
FIG. 4 is an enlarged detail of the embodiment illustrated in FIG. 1.
Figure 2:
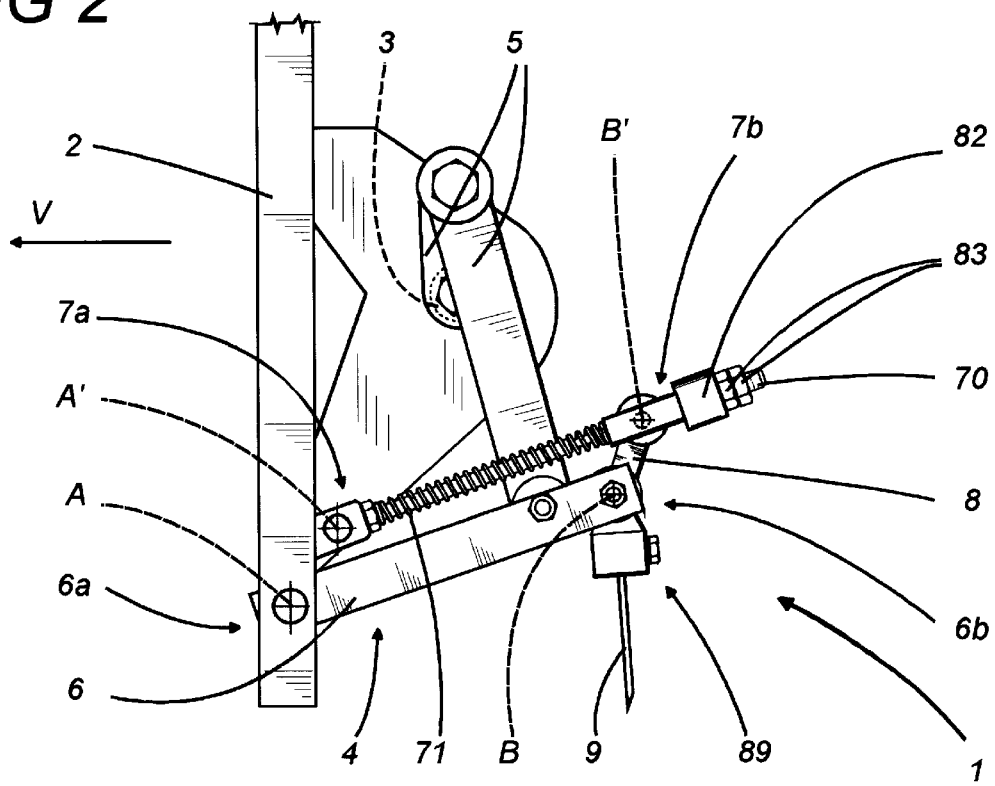
FIGS. 2 and 3 illustrate different positions assumed by the implement in different operating steps.

Looking in more detail, with reference also to FIG. 4, the second rod 7 may also have fitted round it, inside the said spring 71 and coaxially with it, a flexible tubular element 72, which may consist of a piece of rubber tube. The length L72 of this tubular element 72 is less than the length L71 of the spring 71 when the latter is at rest.

In addition, between the sleeve 85 and the aforementioned reversible locking means (the nut and lock nut) there is also a flexible spacer element 82 (for example a rubber pad).

In this way, the tubular element 72 and the spacer element 82 define two flexible elements for stopping the sleeve 85 on the second rod 7.

These limit stops positively contribute to the implement's response to the strain caused by its interacting with the soil as it travels forward.

The invention described can be subject to modifications and variations without thereby departing from the scope of the inventive concept. Moreover, all the details of the invention may be substituted by technically equivalent elements.

What is claimed:

1. An implement for treating soil in order to improve the hygroscopic properties of the soil by making holes in the soil to retain irrigation or rain water, the implement being of the type comprising a supporting frame on which there is fitted at least one mobile structure mounting at least one tool, driven in a substantially vertical direction through a linkage system by a drive shaft in such a way as to cyclically drive the said tool into the soil to make the aforementioned holes, and the said implement being characterized in that the mobile structure is of the jointed, quadrilateral type and is defined by three rigid rods each having a first end and a second free end of which the first and the second rods are placed at different levels, one above the other and substantially parallel to each other, the rods being pivoted at their respective first ends to the supporting frame, and the third rod being pivotally attached at its free end to the free end of the first rod while its first end is slidably linked to the free end of the second rod, the position of the first end of the third rod axially in relation to the second rod being adjustable thanks to means which, towards the free end of the second rod, form an adjustable stop opposing elastic means fitted coaxially to the second rod so that the length of the upper side of the jointed quadrilateral can be changed with respect to the lower side of the quadrilateral.

2. The implement according to claim 1 wherein the free end of the second rod is threaded and the stop means consist of a flexible spacer element held in place by a nut and lock nut screwed on the free end of the second rod.

3. The implement according to claim 1 wherein, round the second rod, there is fitted coaxially inside a spring that defines the elastic means a flexible tubular element which is shorter than the second rod.

* * * * *